3,010,914
CATALYSTS CONTAINING ALUMINA AND PROCESS FOR THE PREPARATION THEREOF
David G. Braithwaite, Chicago, Edwin H. McGrew, Riverside, William P. Hettinger, Jr., Dolton, and Joseph S. D'Amico, Westchester, Ill., assignors to Nalco Chemical Company, a corporation of Delaware
No Drawing. Filed June 19, 1958, Ser. No. 743,015
6 Claims. (Cl. 252—455)

This invention relates to catalysts containing alumina and to a process for the preparation thereof.

It is well known in the catalyst art to use alumina or combinations of alumina and silica as catalysts or as carriers or extenders for various types of catalysts. Various types of clay catalysts have also been proposed and have been used, particularly in the cracking of petroleum hydrocarbons to make gasoline.

The alumina or combinations of alumina and silica consisting predominantly of alumina and with only minor amounts of silica can be prepared by chemical methods and the resultant compositions when prepared by such methods are usually referred to as "synthetic." The clay catalysts, on the other hand, are usually referred to as "natural" catalysts because they are derived primarily from products of nature and except for chemical treatments, such as acid treatment, exist essentially in their natural state.

It is desirable that a catalyst be resistant to attrition, that it also be stable to heat and steam, and, in some cases, that it be capable of being regenerated to remove carbon or carbonaceous by-products that become embedded in the catalyst during its use. The use to which the catalyst is put will determine whether it is satisfactory or unsatisfactory. Thus, a catalyst or catalyst support which is satisfactory in a cracking process may be unsatisfactory in a hydroforming process, or a hydrodesulfurization process, or a hydrocracking process because the operating conditions are usually different in each of these processes.

The physical characteristics of alumina-silica compositions which are used as such or impregnated with other catalytic components, are particularly important in fluidized catalytic processes where the catalyst is in suspension in the reactant gases or vapors and is constantly being circulated and subjected to attrition. Many catalysts which are supported on alumina or alumina-silica bases do not satisfactorily withstand this attrition.

One type of synthetic catalyst which has been developed particularly for operations in fluidized processes consists of alumina or alumina together with silica with or without other oxides in a microspherical form having satisfactory attrition characteristics. This catalyst has been prepared under controlled conditions of temperature, concentration and pH by reactions whereby an alumina hydrogel, or an alumina hydrogel containing a minor proportion of silica hydrogel, is formed and a slurry thereof is spray dried to produce microspherical particles. Natural clays do not lend themselves to the preparation of microspherical particles by spray drying.

In accordance with the present invention, however, it has been found that clays can be incorporated into synthetically prepared slurries of alumina gels which may or may not contain a minor proportion of silica, and the resultant slurries can be spray dried to produce microspherical particles which can be used as such or impregnated with other catalytically active components. The resultant catalyst supports and catalysts exhibit remarkably good stability to heat and steam and retain satisfactory physical characteristics under the conditions used in many hydrocarbon conversion reactions, such as cracking, hydroforming, hydrocracking, isomerization, dehydrogenation and hydrodesulfurization. The invention, therefore, makes it possible to prepare catalyst supports in the first instance which can be widely used for different purposes under a variety of conditions.

The microspherical particles prepared in accordance with the practice of the invention can also be compacted or shaped, either before or after impregnation with other catalytic components, to form shaped masses suitable for hydrocarbon conversions in various types of processes, such as fixed and moving bed processes where macrosized particles in the form of pellets or tablets are often used. The microspherical particles prepared in accordance with the invention can be shaped by extrusion and extruded pellets composed of alumina and silica and containing other catalytically active substances, usch as cobalt oxide and molybdenum oxide, are especially suitable for hydrodesulfurizing reactions.

The microspherical particles impregnated with molybdic oxide are especially suitable for hydroforming reactions where such reactions are carried out under conditions such that the catalyst particles remain suspended in the gas or vapor stream and are maintained in a fluidized state.

The term "hydrocarbon conversion" is used herein to describe generally the conversion of hydrocarbons to various forms by passing the hydrocarbons over a catalyst under varying conditions of heat and pressure.

The term "cracking" as used herein describes a hydrocarbon conversion process in which a hydrocarbon, such as a petroleum oil fraction, is passed over a catalyst at an elevated temperature and at atmospheric or somewhat higher pressures to split higher molecular weight hydrocarbons into lower molecular weight substances, the principal end product being gasoline. The cracking temperatures are usually around 600° F. to 1000° F., preferably around 900° F., and atmospheric pressures or pressures slightly higher than atmospheric are usually employed.

The term "hydroforming" is used herein to describe a process in which gasoline is reformed in the presence of hydrogen in amounts of say 200 to 5000 cubic feet of hydrogen per barrel of gasoline at temperatures within the range of 800° F. to 1000° F. and pressures of 100 to 700 pounds per square inch gauge (p.s.i.g.) where there is no net consumption of hydrogen. This process involves dehydrogenation conditions with some cracking and isomerization and one of its objects is to produce aromatic compounds in the gasoline. The fluid type of catalyst is especially useful in this process.

The term "hydrodesulfurization" refers to a process in which sulfur and other undesirable compounds are removed from a wide variety of products, such as gasoline, kerosene, lubricating oil stock, fuel oils, catalytic cracking feed stocks and even straight crude petroleum oils, by passing the raw stock over a catalyst which is preferably a fixed bed catalyst, at temperatures around 450° F. to 850° F. and pressures of 100 to 1000 p.s.i.g., with the addition of hydrogen preferably in amounts of 200 to 2500 cubic feet per barrel. This process is usually operated at the lowest temperature possible without coking. The higher the partial pressure of hydrogen, the less likely the tendency to coke. The hydrogen is circulated and the sulfur in the hydrocarbons is largely removed as hydrogen sulfide.

The term "hydrocracking" is applied herein to a cracking process in which petroleum hydrocarbons are cracked and then saturated with the addition of hydrogen so that there is a net consumption of hydrogen in the process. The temperatures used are within the range of 600° F.

to 1000° F. and the pressures within the range of 300 to 3000 p.s.i.g. The amount of hydrogen employed is preferably within the range of 500 to 10,000 cubic feet per barrel.

In one process of preparing a catalyst in accordance with the invention, a clay is mixed with an alkali soluble aluminate, as, for example, sodium aluminate, potassium aluminate or calcium aluminate, in an aqueous slurry, and alumina, in hydrous gel form, is produced in said slurry by a suitable chemical reaction between the aluminate and a compound capable of reacting with the aluminate to precipitate alumina. In some instances it is desirable to mix the aluminate with a minor amount of an alkaline silicate, as, for example, sodium silicate or potassium silicate, and form synthetically derived silica as a hydrous gel in the alumina-silica composition.

The resultant composition contains both alumina and silica, the relative proportions being dependent upon the amount of synthetic alumina, or synthetic alumina-silica, the relative proportions of clay added and also upon the relative proportions of alumina and silica in the clay. The proportions of synthetic alumina hydrogel should be 15% to 80% by weight of $Al_2O_3$, calculated on the total weight of $SiO_2$ and $Al_2O_3$. The proportions of synthetic silica hydrogel are 0% to 15% by weight of the total silica and alumina on a dry basis, preferably 1% to 5%. The proportions of $SiO_2$ in the final catalyst should not exceed 55% by weight of the total $Al_2O_3$ and $SiO_2$. The minimum quantity of $SiO_2$, based upon the total $Al_2O_3$ plus $SiO_2$, is 10% and preferably in excess of 15% by weight. In general, clays can be combined with the alumina in proportions such that the resultant alumina-silica compositions contain 20% to 85% by weight of clay particles. For optimum results the relative proportions of clay particles are preferably within the range from 30% to 75% by weight of the alumina-silica composition and excellent results have been obtained with compositions containing approximately equal parts by weight of clay and synthetically derived alumina or alumina-silica.

While the invention is not limited to any theory, it is preferred to mix the clay particles with an alkaline aluminate, which may or may not contain a silicate, prior to the formation of the synthetic alumina in hydrous gel form. Alternatively, the clay can be added, wholly or in part, to the acid (e.g., $H_2SO_4$ or HCl) or aluminum salt (e.g., $Al_2SO_4$ or $AlCl_3$) used to precipitate the alumina.

The following general method illustrates the preparation of a catalyst base suitable for the preparation of a hydroforming catalyst:

(1) The alkali soluble aluminate, preferably sodium aluminate in the form of an aqueous alkaline solution, is intimately mixed with a clay in the proportions necessary to give the required $Al_2O_3$-$SiO_2$ content. If it is desired that the resultant product also contain synthetic silica, one of the essential reactants is a silica-forming compound, for example, an alkali soluble silicate, e.g., sodium silicate, or a silicon tetrahalide, for instance, silicon tetrachloride, in proportions required to give the desired $SiO_2$ content. If a silicon tetrahalide is used as the source of the synthetic silica it is preferably added to an acidic reagent which in turn is added to the aluminate solution.

(2) An acidic reagent is added to precipitate the alumina or alumina-silica, as the case may be, in hydrous form from the alkaline aqueous aluminate solution and this reagent is preferably an acidic aluminum salt, for example, aluminum sulfate. Aluminum chloride and other aluminum salts of acids whose anions form alkali soluble salts with aluminum, and the free acids themselves, can be used as the acidic reagents to bring about the precipitation of the alumina but aluminum sulfate is preferred because of the excellent results obtained by its use and its low cost and ready availability. Aluminum chloride is more expensive and more difficult to handle. The free acids are less expensive but present problems due to localized action. If free acids are used they should be diluted and added to the alkaline aluminate solution under controlled conditions.

(3) The alumina, or alumina and silica, are precipitated from an alkaline aqueous solution at a pH between about 8 and 12 and preferably between 9 and 10.5.

(4) The concentrations of the reactants employed are controlled and the concentration of alumina in the final slurry (without taking into account the alumina content of the clay), is preferably within the range of 1% to 2.5% by weight as $Al_2O_3$. The concentrations of alumina can be as high as 5% or 6% by weight, as $Al_2O_3$, in the final slurry (irrespective of the clay content). A general range of concentration of alumina is from about 0.8% to about 6%, calculated as $Al_2O_3$.

(5) Good results have been obtained by adding the acidic reagent, for example, an aluminum sulfate solution, either simultaneously or in increments.

(6) The temperature of the reaction mixture during the precipitation of the alumina is an important factor but can vary rather widely from temperatures just above the freezing point of water to temperatures just below the boiling point of water. Good results have been obtained at temperatures within the range of 40° F. to 140° F., provided certain precautions are observed. If temperatures in the upper part of the temperature range, say above about 95° F., are used, the pH should also be relatively high in order to precipitate alumina having desirable physical characteristics for fluidized catalysts. One difficulty which is encountered under these operating conditions at a high pH is that the high pH interferes with mechanical operations such as filtration because highly alkaline solutions are very difficult to handle, especially when hot, and tend to destroy or impair filter cloths. This also makes it necessary to use special types of equipment. However, by carrying out the precipitation of the alumina or alumina-silica gels in the presence of an aldonate which is usually added initially as an aldonic acid, it is possible to effect the precipitation and produce alumina or alumina-silica particles in hydrous gel form at a lower pH than is possible without the addition of the aldonic acid or aldonate. Furthermore, it is possible to carry out the process at elevated temperatures which would not be practical with higher pH's. Thus, the precipitation of the alumina or alumina-silica in hydrous gel form at temperatures in excess of about 95° F., preferably around 110° F. to 140° F., at a final pH within the range of 9 to 10.5, can be effected with the addition of an aldonic acid or an aldonate, whereas, under corresponding conditions without the addition of the aldonic acid or aldonate a chalky precipitate is obtained rather than a glassy gel. The use of the higher temperatures has the further advantage that the gels made at the higher temperatures have increased surface area and increased pore volume as compared with products made at lower temperatures. Aldonic acids employed for this purpose can be obtained by the oxidation of an aldose or in any other suitable manner. Gluconic acid is preferably used because it is readily available in the form of an aqueous solution having a concentration of about 50% by weight of gluconic acid. When the gluconic acid is added to an alkaline aluminate solution it is converted to the corresponding alkaline gluconate and if desired the gluconate may be added initially instead of the acid. Other examples of aldonic acids and salts thereof which may be used are galactonic, arobonic, xylonic and mannonic. The aldonic acids exist in several forms and the invention contemplates the use of one or more of these forms or mixtures thereof, including the lactone forms, for example, the gamma lactone form of gluconic acid. Commerical gluconic acid usually contains about 1% glucose. Other examples of suitable aldonates are the potassium, zinc, magnesium, calcium and lithium salts of gluconic acid or other aldonic acids. If an aldonate is used it should be soluble in the reaction medium in the proportions in which it is used. The preferred proportions of aldonic acid or aldonate are within the range of about 0.5% to 6.0% by weight, calculated as gluconic acid, on the weight of $Al_2O_3$ and excellent results have been obtained with proportions in the range of about 2% to 3% of the aldonate, calculated as gluconic acid on the weight of $Al_2O_3$. The aldonic acid can also be added to the acidic reagent used in precipitating the alumina.

(7) After the precipitation of the synthetic alumina or synthetic alumina-silica, the slurry is preferably filtered to increase the concentration of solids to 4% to 7% by weight, as $Al_2O_3$ (irrespective of the clay content). This filtration step is optional but is particularly important where it is desirable to produce microspheres having a particle size within the range of 20 to 100 microns which is a desirable particle size for fluidized catalysts. The filtering step also effects a substantial purification by the removal of soluble salts.

(8) If the precipitation of the alumina or alumina-silica has been effected at a low temperature and it is desired to filter the resultant slurry before drying, it is preferable to heat the slurry to a temperature within the range of 100° F. to 150° F., preferably around 120° F. as an aid to filtration. However, this is optional.

(9) The filtered catalyst composition can be used as such for some purposes but is preferably reslurried with enough water to produce a pumpable mixture and then spray dried. In general, the concentration of the slurry to be spray dried should be at least 3.5% by weight of solids and preferably within the range of 4% to 7% by weight of solids. The spray drying temperature can vary rather widely, depending upon the product desired but is usually within the range of 200° F. to 2000° F. The temperature used will depend on such factors as the quantity of material to be dried and the quantity of air used in the drying. The evaporation rate will vary depending upon the quantity of air used in the drying. The temperature of the particles which are being dried is preferably within the range of 150° F. to 300° F. at the completion of the drying. A maximum particle temperature of 300° F. is desirable in order to avoid temperatures that would cause conversion of one form of aluminum to another. At approximately 400° F. the aluminum trihydrate is converted to the monohydrate. For some purposes, of course, the latter form of alumina may be desirable and in such event the drying can be effected under conditions sufficient to produce a temperature higher than 300° F. in the final dried particles. The drying is preferably effected by a process in which the particles to be dried and a hot air stream are moving in the same direction for the entire drying period. This is usually referred to as concurrent drying as distinguished from countercurrent drying, or drying of the type carried out in a cyclone apparatus. Concurrent drying has the advantage for the present invention that it gives large particles an opportunity to dry before they can adhere to the walls of the drier or to other particles.

The alumina-silica microspheres can, if desired, be treated in conventional ways to remove alkali metal ions and sulfate ions. They are then passed into a flash drier to remove excess moisture until the total volatile content is below about 20% by weight.

The resultant alumina-silica microspheres can be used as such as a cracking catalyst. Where they are to be used as a hydroforming catalyst they are impregnated with an oxide of molybdenum. This can be accomplished by immersing the microspheres in a solution of ammonium molybdate containing about 14.5% $MoO_3$. The quantity of this solution which is used should be enough to cause the alumina-silica microspheres to pick up about 10% to 11% $MoO_3$ on the dry weight of the final catalyst. The resultant material is flash dried and activated by calcining at a temperature around 1350° F. to 1400° F. and is then ready for use as a catalyst in hydroforming operations on gasoline.

The invention will be further illustrated but is not limited by the following examples in which the quantities are stated in parts by weight unless otherwise indicated.

Example I

A solution A was prepared by mixing together 5860 parts of Chicago tap water, 49.6 parts of commercial gluconic acid containing about 50% by weight of gluconic acid, 3840 parts of sodium aluminate, 69 parts of sodium silicate and 1127 parts on a dry basis of Georgia kaolin clay known as KA-2.

The Georgia kaolin clay contained 39.4% by weight $Al_2O_3$, 41.9% by weight $SiO_2$, 0.22% by weight iron and showed a loss on ignition of 16.4% by weight.

The sodium silicate had a specific gravity of 1.39 and contained 28.6% by weight $SiO_2$. The sodium aluminate had a specific gravity of 1.5 and contained 23.6% $Al_2O_3$.

A solution B was prepared by mixing 1995 parts of 35% $H_2SO_4$ with 6215 parts of Chicago tap water.

A solution C was prepared by mixing 2370 parts of alum with 8550 parts of Chicago tap water.

Solution A was heated to 114° F. and then solution B was added during a period of 15 minutes. The resulting slurry was mixed for 5 minutes and to it was then added solution C during a period of 15 minutes. The final pH of the slurry was 9.5 and the temperature 110° F.

The slurry was then filtered and the filter cake reslurried with water to give a slurry of about 4% solids. This slurry was then spray dried. The dried microspheres were washed with hot water (120° F.) until the sodium content had been reduced to less than 0.04% and then treated with diluted ammonia until the sulfate content had been reduced below 0.5%.

The alumina-silica composition contains about 72.5% $Al_2O_3$ and 27% $SiO_2$, the remainder being impurities. The molar ratio of $SiO_2 : Al_2O_3$ was approximately .63:1.

Example II

Samples of the catalyst base prepared as in Example I were tested in a Universal Oil Products Company test unit to determine the relative activity of the catalyst as a cracking catalyst. In this test a Mid-Continent gas oil fraction having an API gravity of 32.3°, an initial boiling point of 536° F., an end boiling point of 734° F. and containing .35% sulfur is passed at atmospheric pressure and at 932° F. over a solid bed of the catalyst contained in a furnace at a space velocity of said gas oil of approximately four volumes per volume of catalyst per hour (4 VHSV). The liquid hydrocarbon product is fractionated and the part boiling at a temperature below 400° F. is condensed in a suitable receiver and represents the gasoline fraction. A sample of primary standard catalyst (100 volume activity rate by definition) is processed at 2, 4 and 8 VHSV to obtain conversion of gas and gasoline. These conversions are plotted against reciprocal space velocity to obtain a standard calibration curve. Any point on such curve represents 100 volume activity rating. All unknown samples are processed under the above described conditions at 4 VHSV. The volume activity of such unknown is 100 times the ratio of space velocities of the unknown and standard required to obtain the same conversion levels. From the data on the unknown, the calibration line and the apparent bulk density, both the volume activity and the weight activity of the unknown are readily calculated.

Where the catalyst is given no pretreatment, the activity is usually referred to as "initial activity." Where the catalyst is pretreated by steaming under 60 pounds steam pressure at 1200° F. for 16 hours, the activity is referred to as "activity after steaming." In general, with any given catalyst the initial activity will be higher than the activity after steaming. The activity after steaming is of more practical value in evaluating the catalyst.

The operating conditions and results are given in the following table:

|  | Run No. 1 | Run No. 2 |
|---|---|---|
| Volume of catalyst samples | 25 ml. | 25 ml. |
| Pretreatment of Catalyst | 2 hrs. at 932° F. | 6 hrs. at 1,200° F., 60 lb. steam. |
| Volume of Feed Stock | 200 ml. | 200 ml. |
| RESULTS | | |
| Relative Volume Activity | 30 | 29 |
| Apparent Bulk Density (ABD) | .33 | .34 |
| Relative Weight Activity | 46 | 43 |
| PHYSICAL PROPERTIES OF BASE | | |
| Surface Area | 297 m.²/g. | |
| Pore Volume | .52 cm³/g. | |
| Pore Diameter | 43 A. | |

From the foregoing results it is evident that the activity of the catalyst was approximately the same after steaming as before steaming and this indicates good stability.

Example III

The catalyst base prepared as described in Example I was dried for about 8 hours at 240° F. and a sample of the base was impregnated with ammonium molybdate solution to give a catalyst containing 10.5% $MoO_3$, 65% $Al_2O_3$, 24.2% $SiO_2$ and the remainder impurities. The resultant catalyst had a surface area of 308 square meters per gram, a pore volume of 0.41 cubic centimeters per gram and a pore diameter of 70 A.

This catalyst was tested in a hydroforming test unit under the following conditions and with the results given in the following table.

Heavy gasoline.
Feed stock, API gravity at 60° F___ 55.0.
Aniline point_____ 126.
Operating conditions_____ 908° F., 200 p.s.i.g.
Activation temperature of catalyst__ 6 hours at 1360° F.
Feed rate (weight of feed stock per hour per weight of catalyst)____ 1.415.
Catalyst sample_____ 200 ml.=86.2 grams.

RESULTS

Initial activity_____ .99–1.16 (ratio).
—$\Delta C_5^+$_____ —2.1%.
—$\Delta C_6^+$_____ —2.7%.
Carbon (C)_____ .61 (ratio).

The results obtained in the foregoing test are based upon a comparison between the catalyst tested and the results obtained under comparable conditions with a standard synthetic catalyst containing 87.5% $Al_2O_3$, 2% $SiO_2$ and 10.5% $MoO_3$. The comparison shows that the initial activity of the catalyst tested which is a ratio between the activity of the catalyst tested and the standard catalyst is approximately the same or somewhat higher than the activity of the standard catalyst. The $C_5$ and $C_6$ products were slightly less with the catalyst tested. The amount of carbon formed with the catalyst tested as compared with the standard catalyst was substantially less as indicated by the ratio given in the table. The test indicates, in general, that the catalyst containing clay gave good results in hydroforming comparable to those obtained with a conventional hydroforming catalyst.

Example IV

The catalyst composition prepared as described in Example I was impregnated with molybdenum trioxide and cobalt carbonate by making an aqueous slurry and adding sufficient molybdenum trioxide and cobalt carbonate to yield a mixture containing 12.5% $MoO_3$ and 3% CoO. The mixture was heated for 1 hour at 170–180° F. and then filtered. The filter cake was dried over night at 225° F. The dry material was placed in a Simpson muller and its water content adjusted to 52%. The wet material was then extruded and the extrudate predried 2 hours at 250° F. and calcined 6 hours at 1150° F. The resultant catalyst had a surface area of 234 m.²/g., a pore volume of .41 cm.³/g. and a pore diameter of 70 A. The apparent bulk density was 0.62. In terms of chemical composition this catalyst contained about 61.5% $Al_2O_3$, 23% $SiO_2$, 12.5% $MoO_3$ and 3% CoO on a weight basis.

Example V

The catalyst prepared as in Example IV was tested as a hydrodesulfurization catalyst at a temperature of 700° F. and a pressure of 450 p.s.i.g. on a West Texas sour crude oil feed stock containing 1.77% sulfur and having an API gravity at 60° F. of 24.0. The feed rate, i.e., the volume of feed stock per volume of catalyst per hour, was 4 and hydrogen was fed at the rate of 3500 cubic feet per barrel.

The relative volume activity as compared with the results obtained with the standard catalyst was 115. The relative weight activity was 139.

Example VI

The procedure was the same as that described in Example I except that crystal silica clay was substituted for the Georgia kaolin clay. The crystal silica clay contained about 18.7% $Al_2O_3$, 1.7% Fe, around 27.6% water and the remainder substantially all silica.

The resultant catalyst contained approximately 58% $Al_2O_3$, 40% $SiO_2$ and the remainder impurities, including iron. The mol ratio of $SiO_2:Al_2O_3$ was about 1.15:1.

This catalyst is suitable for use as a cracking catalyst.

Example VII

A slurry A was prepared by mixing together 68,000 parts of Chicago tap water at 80° F., 410 parts of sodium carbonate, 2500 parts of sodium aluminate containing 23.6% by weight $Al_2O_3$ dissolved in water and 1135 parts of a Georgia kaolin clay as described in Example I.

A solution B was prepared by dissolving 5340 parts of alum containing 7.8% by weight of $Al_2O_3$ in water and having a specific gravity of 1.27 and mixing the alum solution with 15,500 parts of Chicago tap water.

A solution C was prepared by mixing 515 parts of a sodium aluminate solution containing 23.6% by weight $Al_2O_3$ and having a specific gravity of 1.5 with 510 parts of Chicago tap water.

Solution B was added to solution A at a temperature of 80° F. during a period of 90 minutes. The pH of the slurry at this point was 5.0. The pH was then adjusted to 8.5 by the addition of solution C which required about 10 minutes. After heating to 120° F. the slurry was filtered and the filter cake reslurried in water to produce a slurry containing about 4% solids. This slurry was then spray dried and a dry powder was purified by washing with water until the sodium content was reduced below 0.04% by weight. The resultant composition was then treated with ammonia and rinsed with water until the sulfur content had been reduced below 0.05% by weight.

Molybdenum trioxide and cobalt carbonate were then added to the mixture in the order listed and in quantities to yield a catalyst containing about 12% $MoO_3$ and 3% CoO. This catalyst also contained 62.5% $Al_2O_3$, 22.3% $SiO_2$ and small amounts of impurities.

The product was dried over night or for about 8 hours at 250° F. The moisture was then increased to about 50% by weight and the mixture was extruded into a ⅛" diameter extrudate. The extrudate was predried and then calcined at 1150° F.

This catalyst had the following physical properties:

| | | |
|---|---|---|
| Surface area | m.²/g | 153 |
| Pore volume | cm.³/g | .27 |
| Pore diameter | A | 71 |
| Crush strength—after calcining 6 hours at 1150° F. | pounds | 19 |
| Crush strength—after steaming the calcined catalyst at 1150° F. 16 hours | pounds | 14.0 |
| Crush strength—after heating 16 hours at 1550° F. | pounds | 14.5 |

A standard catalyst made in a similar manner but without the addition of the clay had a crush strength after calcining for 6 hours at 1150° F. of 14 pounds, a crush strength after heating 16 hours at 1550° F. of 2–5 pounds, and a crush strength after steaming the calcined catalyst 16 hours at 1150° F. of 4–7 pounds. The catalyst as described in the present application, therefore, exhibited much better physical characteristics and stability than a standard synthetic catalyst. The apparent bulk density is 0.76.

Example VIII

The catalyst prepared as described in Example VII after being activated by heating for 6 hours at 1150° F. was tested for its hydrodesulfurization properties in the same manner described in Example V.

The relative volume activity as compared with a standard catalyst under the same conditions was 155 and the relative weight activity was 154. Thus, the catalyst of the present invention showed a pronounced improvement over the standard catalyst.

Example IX

The procedure was the same as that described in Example VII except that a synthetic catalyst base was prepared without the addition of the clay. A portion of this material equal to 1.25 pounds on a dry basis was slurried with ½ gallon of water. A quantity of the KA–2 clay equal to 1.25 pounds on a dry basis was then added to the resultant slurry and mixed well. Molybdenum trioxide and cobalt carbonate were then added to the mixture in the order given and in quantities to yield a catalyst containing 12% $MoO_3$ and 3% $CoO$. The mixture was heated for 1 hour at 170–180° F. and then filtered. The filter cake was dried over night (about 8 hours) at 300° F.

The moisture content of the resultant product was then adjusted to about 50% by weight by adding water and the product was extruded to produce a ⅛″ diameter extrudate which was predried at 200° F. for 2 hours and then calcined at 1150° F. for 6 hours.

This gave a catalyst containing approximately 62.5% $Al_2O_3$, 22.3% $SiO_2$, 12% $MoO_3$ and 3% $CoO$ on a weight basis, the remainder being impurities.

This catalyst had the following physical properties:

| | | |
|---|---|---|
| Surface area | m.²/g | 149 |
| Pore volume | cm.³/g | .24 |
| Pore diameter | A | 64 |

When tested as described in Example V, the following results were obtained with this catalyst:

| | |
|---|---|
| Relative volume activity | 125 |
| Relative weight activity | 139 |
| Apparent bulk density | .68 |

This is also a good hydrodesulfurization catalyst, but not as good as the catalyst prepared by the preferred procedure of Example VII. This process is also less desirable because filtering difficulties are encountered after impregnation.

Example X

A solution A was prepared by mixing 29,000 parts of Chicago tap water, 450 parts of sodium carbonate, 2760 parts of sodium aluminate containing 23.6% by weight $Al_2O_3$ dissolved in water and 1135 parts on a dry basis of crystal silica clay.

A solution B was prepared by mixing 17,000 parts of Chicago tap water with a solution of alum containing 7.8% $Al_2O_3$ in water.

A solution C was prepared by mixing 545 parts of Chicago tap water with 555 parts of a solution of sodium aluminate containing 23.6% $Al_2O_3$ in water.

Solution A was heated to 80° F. and solution B was added thereto over a period of 90 minutes. The pH of the slurry at this stage was 5.0 to 5.5. After mixing for about 10 minutes, the pH was adjusted to 8.5 by the addition of solution C during a period of 10 minutes.

The slurry was filtered and the filter cake was reslurried in water to give a slurry of about 4% solids and spray dried to produce microspheres.

This product is particularly useful as a base for hydrodesulfurization catalysts made by impregnating the base with $MoO_3$ and $CoO$ in the manner previously described in Example VII.

The clays which have been found to be of practical importance in the practice of the invention are the micaceous or platy clays which are characterized by a layered structure. Good results have been obtained with the kaolinite clays as shown by Examples I to V, VII, VIII and IX. Good results have also been obtained with a montmorillonite clay as shown by Examples VI and X where the crystal silica clay is a montmorillonite.

The kaolinitic clay used in the practice of the invention contains about two moles of $SiO_2$ per mole of $Al_2O_3$. It has a crystalline structure which is planar and hexagonal. The average longest dimension of the hexagonal particles varies within the range of 0.1 to 20 microns and the particles are relatively thin, the thickness usually being less than one-tenth of the longest dimension.

Kaolinites of this type are found particularly in Georgia and also in other parts of the United States. The kaolinite crystals are prepared for use in the present invention by conventional methods which involve such well known steps as blunging with water, adding a polyphosphate such as sodium hexametaphosphate to keep the clay in suspension, screening out quartz, centrifuging, washing with sulfuric acid, for example at a pH of 3.5, bleaching and flocculating with small amounts of various types of flocculants such as alum, filtering, drying and grinding. Iron and titanium are often present in natural clays, e.g., as ilmenite, and a large part of this is removed during the centrifuging.

The clays used in the practice of this invention are preferably high purity clays containing not more than 2% by weight of iron as $Fe_2O_3$. The presence of iron in a catalyst tends to produce hydrogen formation during cracking and if the iron content of the clay exceeds about 2% by weight it is desirable to leach the clay with an inorganic acid prior to use in the practice of the invention in order to reduce the iron content below 2% by weight as $Fe_2O_3$ and render the clay more suitable for use as an ingredient in a cracking catalyst. For some purposes, of course, the presence of the iron in the resultant composition may not be objectionable.

In addition to having an iron content within the limits specified, it is beneficial if the clay contains amounts of particles having colloidal fineness. Thus, kaolinites having at least 10% by weight of one micron or less sized particles are preferred. The greater the percentage of colloidal particles in a given clay the more desirable it is for use in catalyst manufacture. Fine particle clays may be obtained using known sedimentation-fractionation techniques. While clay of colloidal fineness are preferred, those clays having substantial quantities of particles in excess of five microns have proven useful in the practice of the invention.

Kaolinites are usually segregated into particle size ranges, such as, for example, by centrifuging, air floating or settling. Two commercially available products, "Premax" and "Hydrite" are examples of fine and coarse grades of clay. "Premax" has a particle size such that 10% by weight is less than 0.2 micron, 50% by weight less than 0.6 micron, and 90% by weight less than 1.6 microns. "Hydrite" is typical of a coarse clay. Its particle size distribution will have about 10% by weight of the particles less than 0.6 micron, 50% by weight less than 5.2 microns, and 90% by weight less than 20 microns. The above descriptions are illustrative only and are not intended as being limitations.

Other clays, such as montmorillonite clays, contain a higher mole ratio of silica to alumina, the mole ratio in the case of the montmorillonite clays being around 4:1 as contrasted with a mole ratio of 2:1 in the clays of the kaolinite group. In some cases, as in the case of the montmorillonites, magnesium can be incorporated into the catalyst because it forms a part of the clay.

In practicing the invention where the clay is blended with a separately precipitated alumina hydrogel slurry, it is preferable to peptize the clay with conventional peptizing agents, such as polyphosphates (e.g., sodium hexametaphosphate, sodium acid pyrophosphate and tetrasodiumpyrophosphate), sodium silicate and/or ammonia. The clay can also be acid treated with sulfuric acid or hydrochloric acid or other mineral acid to remove a portion of the alumina, as well as some of the impurities. Thus, sulfuric acid treated kaolinitic clay is highly useful in the practice of the invention. Acid treating the clay before using it produces some advantages in filtering and also makes it possible to wash cations from the clay.

While proportions of clay that may be incorporated or combined with synthetic alumina or synthetic combinations of alumina and silica can vary rather widely as previously indicated, there is no practical value to adding the clay if the quantity is less than 20% by weight and the attrition characteristics of the particles tend to deteriorate if the quantity of clay, based on the weight of the total composition, exceeds 85% by weight. The general weight ratio of clay to synthetic hydrogel is preferably 1:4 to 4:1 and the optimum range is from about 1:1 to 2:1.

The quantity and type of clay used is also preferably such that taking into consideration the synthetic alumina and synthetic silica, if any, present, the total $Al_2O_3$ content of the catalyst is within the range of 33% to 89% by weight, the $SiO_2$ content is within the range of 10% to 55% by weight and the quantities of added components are within the range of 0% to 20% by weight. Where kaolinite clay is used the $SiO_2$ content of the catalyst does not exceed 48% by weight and is preferably 20% to 48%. It will be understood that all percentages are by weight on a dry basis and total 100%, exclusive of impurities.

It is also preferable in the practice of the invention that the mole ratio of $SiO_2 : Al_2O_3$ in the catalyst be within the range of 0.19:1 to 2.8:1.

Among the catalytic agents which may be carried on an alumina-silica base prepared as herein described are the oxides and other compounds of the related metals which have their differentiating electron in the second from the outermost shell (see W. F. Luder, Jour. of Chem. Ed. 16:394 (1939) for a description of the related metals). These metals are vanadium, manganese, zinc, scandium, iron, cobalt, chromium, copper, titanium, nickel, columbium, masurium, yttrium, rhodium, palladium, molybdenum, hafnium, ruthenium, zirconium, iridium, silver, lanthanum, platinum, thorium, mercury, uranium, gold, tungsten, cadmium, rhenium, tantalum, osmium, and actinium. The incorporation of these metals with the alumina-silica base of the type herein described can be effected by a suitable treatment of the base with the sulfates, chlorides, nitrates, molybdates, vanadates, chromates and other suitable salts by impregnation, precipitation, co-precipitation with the alumina or according to methods well known in the art. While the amount of the compound of the related metals incorporated with the alumina-silica composition is subject to variation it is preferable to use a quantity of such compound, or mixtures of two or more such compounds, sufficient to produce a resultant catalyst containing 0.5% to 20% by weight of such compound or mixtures thereof. The alumina-silica base can also have incorporated therewith calcium oxide, magnesium oxide, phosphates, fluorides, zirconia, titania and/or thoria, preferably in amounts of 0.5% to 10% by weight.

The alumina-silica base herein described is particularly suitable for use as a carrier for the oxides or molecular combinations of chromium, molybdenum, cobalt, nickel, tungsten and vanadium. As an illustration, a carrier consisting essentially of alumina and silica of the type herein described can be used to support 10% to 12.5% of molybdenum oxide. Similar catalyst can be prepared containing as additional ingredients up to 10% of titania and/or iron oxide.

The invention makes it possible to prepare various types of catalysts at a lower cost than is possible ordinarily in the preparation of synthetic catalysts. Contrary to expectation, the relatively high silica content of the catalyst does not adversely affect its utility by harmfully altering product distribution. It has been known heretofore that small amounts of usually around 1% to 2% and sometimes up to 15% can be used in hydroforming catalysts consisting of alumina, silica and molybdenum oxide. However, it has always been considered that quantities of silica larger than 15% by weight of the total catalyst would have an adverse effect. The present invention demonstrates that in a catalyst of the type herein described higher silica contents can be tolerated. At the same time, the stability of the catalyst is enhanced. In the hydrodesulfurization catalyst particularly, not only has greater activity been attained but an important improvement in crush resistance has been obtained.

The invention is hereby claimed as follows:

1. A catalyst composition comprising spray-dried microspherical particles with an average particle size within the range of about 20–100 microns of a synthetic hydrogel consisting essentially of alumina hydrogel in which is dispersed small particles of clay in which the major portion of the clay particles are within the range of 0.1 to 20 microns as the largest dimension of said particles, said clay containing not more than 2% by weight of iron expressed as $Fe_2O_3$, the weight ratio of said clay to said synthetic hydrogel falling within the ratio of 1:4 to 4:1.

2. A catalyst composition comprising spray-dried microspherical particles with an average particle size within the range of about 20–100 microns of a synthetic hydrogel consisting essentially of alumina hydrogel in which is dispersed small particles of clay in which the major portion of the clay particles are within the range of 0.1 to 20 microns as the largest dimension of said particles, said clay containing not more than 2% by weight of iron, expressed as $Fe_2O_3$, the weight ratio of said clay to said synthetic hydrogel falling within the ratio of 1:4 to 4:1, wherein said particles are impregnated with 0.5 to 20% by weight on a dry basis with a compound, catalytically active in the conversion of hydrocarbons, of one of the related metals having its differentiating electron in the second outermost shell.

3. A composition as claimed in claim 1 wherein said particles are impregnated with 0.5 to 20% by weight on a dry basis of molybdenum oxide.

4. A composition as claimed in claim 1 wherein said particles are impregnated with 0.5 to 20% by weight on a dry basis with a combination of molybdenum oxide and cobalt oxide.

5. A hydroforming catalyst consisting essentially of a composition as claimed in claim 1 wherein the microspherical particles are impregnated with approximately 10% to 12.5% by weight of molybdenum oxide on a dry basis.

6. A hydrodesulfurization catalyst consisting essentially of a composition as claimed in claim 1 wherein said particles are impregnated with approximately 12% by weight of molybdenum oxide and 3% by weight of cobalt oxide on a dry basis.

References Cited in the file of this patent

UNITED STATES PATENTS

| | | |
|---|---|---|
| 2,369,001 | Ahlberg et al. | Feb. 6, 1945 |
| 2,374,313 | Veltman | Apr. 24, 1945 |
| 2,440,756 | Oulton | May 4, 1948 |
| 2,487,065 | Milliken | Nov. 8, 1949 |
| 2,799,626 | Johnson et al. | July 16, 1957 |
| 2,862,875 | Morrell | Dec. 2, 1958 |